(12) United States Patent
Elie-Dit-Cosaque et al.

(10) Patent No.: US 8,031,630 B2
(45) Date of Patent: Oct. 4, 2011

(54) METHOD AND APPARATUS FOR UPDATING PROVIDER DOMAIN DUE TO CUSTOMER TCNS

(75) Inventors: David Elie-Dit-Cosaque, Richardson, TX (US); Girish Chiruvolu, Plano, TX (US); Jessy Rouyer, Addison, TX (US); Ljubisa Tancevski, Dallas, TX (US); Jean-Francois Cartier, Treillieres (FR); Laurence Rose, Oak Park, CA (US); L. Michele Goodwin, Westlake Village, CA (US)

(73) Assignee: Alcatel Lucent, Paris (FR)

( * ) Notice: Subject to any disclaimer, the term of this patent is extended or adjusted under 35 U.S.C. 154(b) by 1213 days.

(21) Appl. No.: 10/737,219

(22) Filed: Dec. 16, 2003

(65) Prior Publication Data

US 2004/0174828 A1 Sep. 9, 2004

Related U.S. Application Data

(60) Provisional application No. 60/451,452, filed on Mar. 3, 2003.

(51) Int. Cl.
*H04L 12/28* (2006.01)
(52) U.S. Cl. ........................................ 370/254
(58) Field of Classification Search .................. None
See application file for complete search history.

(56) References Cited

U.S. PATENT DOCUMENTS

| 5,822,305 | A * | 10/1998 | Vaishnavi et al. | 370/254 |
|---|---|---|---|---|
| 6,330,229 | B1 | 12/2001 | Jain et al. | |
| 6,388,995 | B1 * | 5/2002 | Gai et al. | 370/256 |
| 6,973,023 | B1 * | 12/2005 | Saleh et al. | 370/217 |
| 7,277,399 | B1 * | 10/2007 | Hughes, Jr. | 370/252 |
| 2002/0147800 | A1 * | 10/2002 | Gai et al. | 709/221 |
| 2003/0235157 | A1 * | 12/2003 | Boivie et al. | 370/254 |
| 2004/0151129 | A1 * | 8/2004 | Kun-Szabo et al. | 370/254 |
| 2005/0259597 | A1 * | 11/2005 | Benedetto et al. | 370/254 |
| 2006/0077909 | A1 * | 4/2006 | Saleh et al. | 370/254 |

OTHER PUBLICATIONS

Finn, "Provider Bridge Unlearn Signaling," [online], [retrieved on Dec. 16, 2003]. Retrieved on Internet <URL: http://www.ieee802.org/1/files/public/docs2003/unlearnsignal.pdf.
IEEE; ANSI/IEEE Standard 802.1D; Information Technology-Telecommunications and Information Exchange Between Systems—Local and Metropolitan Area Networks—Common Specifications—Part 3: Media Access Control (MAC) Bridges; 1998; pp. 59-113.
IEEE; Part 3 Media Access Control (MAC) Bridges—Amendment 2: Rapid Reconfiguration; IEEE Standard-802.1w-2001; Jul. 9, 2001; pp. i-108.

* cited by examiner

*Primary Examiner* — Chi Pham
*Assistant Examiner* — Mohammad Adhami
(74) *Attorney, Agent, or Firm* — Garlick Harrison & Markison (57) ABSTRACT

Customer virtual local area networks (C-VLANs) connecting multiple LAN segments are set up through a provider network (12). Provider edge bridges (PEs) are coupled to customer edge bridges (CEs) to provide a transparent link between LAN segments. To determine whether a backdoor link is used in the C-VLAN topology, PEs monitor MAC address from a predetermined time after a TCN is received to determine if there are contradictory addresses or new addresses relative to the existing MAC address tables (or forwarding databases) that are indicative of a backdoor link. If so, an unlearning message is sent to bridges in the provider domain. In another embodiment, CEs set a snoop bit to indicate which TCNs must be snooped.

10 Claims, 11 Drawing Sheets

METHOD AND APPARATUS FOR UPDATING PROVIDER DOMAIN DUE TO CUSTOMER TCNS

CROSS-REFERENCE TO RELATED APPLICATIONS

This application claims the benefit of the filing date of provisional application U.S. Ser. No. 60/451,452, filed Mar. 3, 2003, entitled "Selective Customer TCN-BPDU Snooping Across Provider Domain" to Elie-Dit-Cosaque et al.

STATEMENT OF FEDERALLY SPONSORED RESEARCH OR DEVELOPMENT

Not Applicable

BACKGROUND OF THE INVENTION

1. Technical Field

This invention relates in general to electronic communications and, more particularly, to virtual local area networks.

2. Description of the Related Art

One of the most important application of metropolitan area networks (MANs) is their use in virtual local area networks (VLANs), where a provider network transparently connects multiple local area networks (LANs), typically spanning over multiple customer locations. By connecting to a provider MAN, the customer can create a wide-area network (WAN) without purchasing or maintaining expensive equipment.

Many VLANs are implemented using a spanning tree protocol, such as an IEEE 802.1D protocol. A spanning tree protocol is used to resolve the problem of traffic loops. In a layer 2 (L2) or similar protocol, there is a single path between any two endpoints. Frames are passed from source to destination through a series of transparent bridges, each of which learns how to forward incoming frames of data by "snooping" the frames and associating media access control (MAC) addresses (destination address) with specific ports in an internal file. The internal file is described herein as the MAC address table, although other structures, such as a forwarding database structure, can be used as well.

If an incoming frame has a known MAC address (a MAC address that can be found in the bridge's MAC address table), the bridge will forward the frame at the port specified by the table. If an incoming frame has an unknown MAC address (one that is not found in the bridge's table), then the bridge broadcasts the frame to all of its active (unblocked) ports. The bridge then associates the MAC address with the successful port for future reference. The process of determining the relationships between end host address and the bridge's ports is referred to as learning.

An important aspect of the simplicity of the VLAN is that the customer can implement the VLAN as if the provider network simply provides one or more links between bridges. Accordingly, the spanning tree software of the VLAN only accounts for bridges on the customer's premises. The spanning tree software is responsible for eliminating redundant paths between any two end nodes, while maintaining complete connectivity. To eliminate loops (redundant paths), various ports of the bridges in a VLAN are blocked by the spanning tree software.

When changes are made to the topology of the customer's VLAN, topology change notifications (TCNs) are sent to other bridges in the customer VLAN, since the topology changes may necessitate flushing of the MAC address tables ("unlearning"), due to changes in the paths by the spanning tree software.

Topology changes in the Customer VLAN can also require changes in the MAC address tables in the bridges of the provider network. A previous proposal allows snooping on all TCNs generated within the customer domain, and taking action indiscriminately. Each time a TCN is generated, the provider domain unlearns (flushes the MAC table of each bridge) and re-learns all the addresses. Re-learning the MAC address at each bridge is a costly and time-consuming operation.

Therefore, a need has arisen for an efficient method of taking action inside the provider domain responsive to TCNs received from the customer domain.

BRIEF SUMMARY OF THE INVENTION

In a first aspect of the present invention, two or more customer local area network (LAN) segments communicate through a provider network, with each customer LAN segment including a customer edge bridge, and the where the provider network has one or more provider edge bridges coupled to the customer edge bridges. In each of the provider edge bridges coupled to a customer LAN segment, topology change notifications (TCNs) are received from the customer edge bridges and, in response to receiving a TCN, each provider edge bridge monitors end host addresses in the data units received from the customer. LAN segments for a predetermined time period. A provider edge bridge flushes an address memory file if a data unit is received in the predetermined time period that has an end host address indicating that a topology change has occurred in one or more of the customer LAN segments affecting paths of data units through the provider network.

In a second aspect of the present invention, two or more customer local area network (LAN) segments communicate through a provider network, with each customer LAN segment including a customer edge bridge, and the provider network has one or more provider edge bridges coupled to the customer edge bridges. In each edge bridge of a LAN segment having a multi-homed connection to the provider network topology change notifications (TCNs) are flagged by the edge bridge if they relate to topology changes affecting paths of data units through the provider network. In each of the provider edge bridges coupled to a customer LAN segment, topology change notifications (TCNs) are received from the customer network and, in response to receiving a flagged TCN, unlearning is initiated in the provider domain; if the TCN is not flagged, the TCN is passed without initiating unlearning.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-9 of the drawings, like numerals being used for like elements of the various drawings.

Figure 1A:
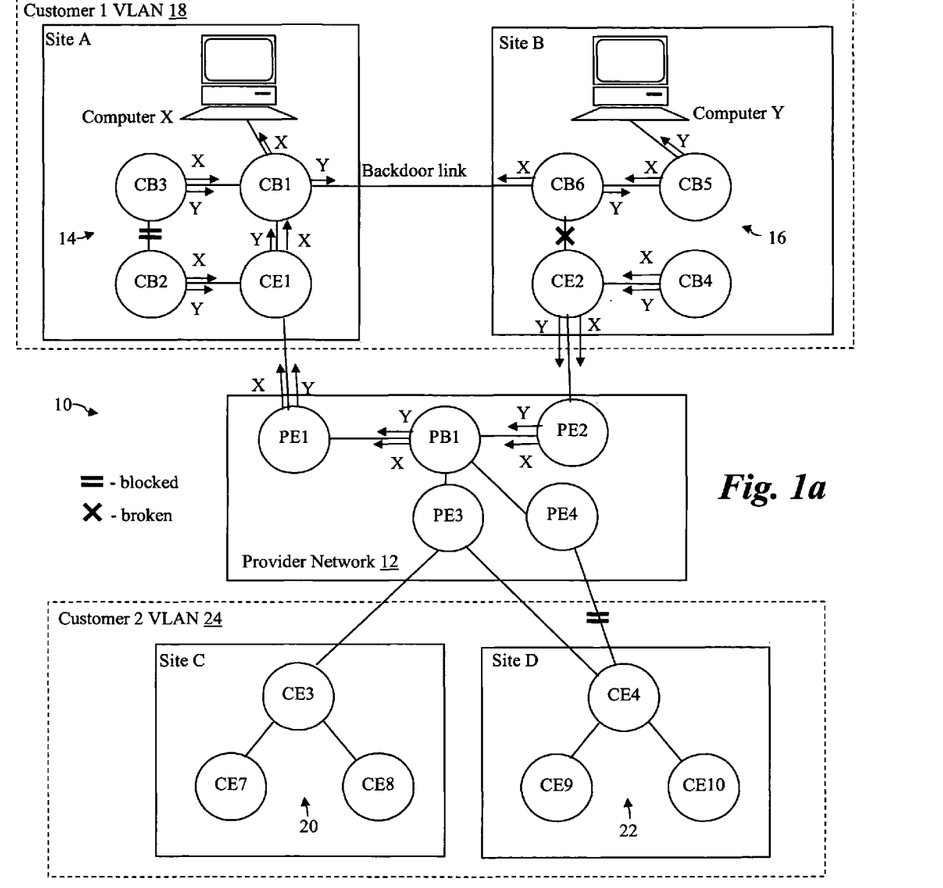
FIGS. 1a through 1c is illustrate a Customer VLAN using a backdoor connection.
Figure 1B:
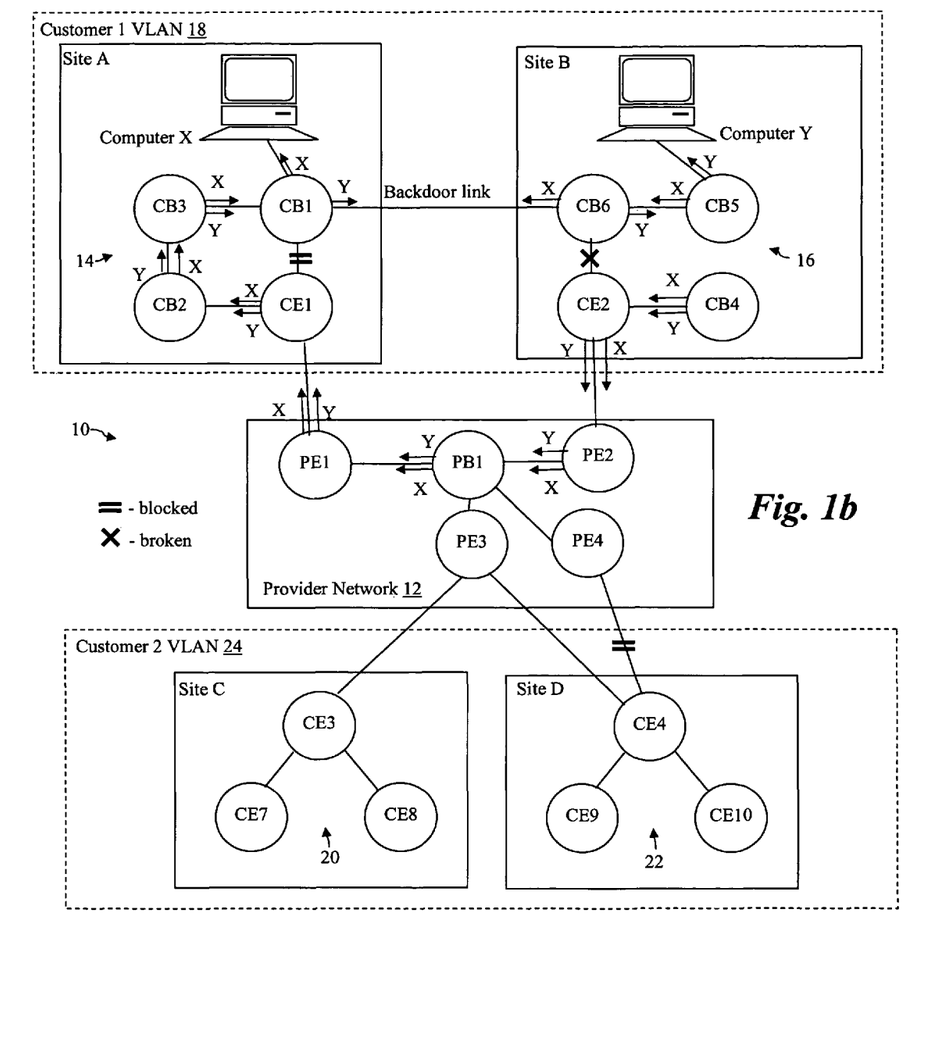

FIGS. 1a and 1b illustrate a metropolitan area network 10 where a first customer, Customer 1, has two sites, Site A and Site B coupled through a provider network 12. Provider network 12 couples the LAN 14 of Site A with the LAN 16 of Site B to create a Customer VLAN 18. Similarly, a second customer, Customer 2, has two sites, Site C and Site D coupled through the provider network 12. Provider network 12 couples the LAN 20 of Site C with the LAN 22 of Site D to create a Customer VLAN 24. In practice, the provider network 12 may provide coupling for a large number of customer VLANs, and customers may configure their LANs into different VLAN topologies. Provider network 12 can also be partitioned into multiple Provider VLANs.

Each LAN is implemented using one or more bridges. A bridge in a customer LAN that connects to the provider network 12 is referred to as a "customer edge bridge" and is denoted in the drawings as "CEx". Similarly, a bridge in the provider network that connects to a customer edge bridge is referred to as a "provider edge bridge" and is denoted in the drawings as "PEx". Other bridges are denoted as "CBx" for bridges in a customer LAN and "PBx" for bridges in a provider LAN. An end host (Computer X) resides on bridge CB1 of Site A and another end host (Computer Y) resides on bridge CB5 of Site B.

A VLAN "segment" is defined as a network of customer bridges that are physically connected. A customer VLAN (or "C-VLAN") is a collection of one or more physically separate VLAN segments that are logically connected through a provider network. A "dual-homed" (or "multi-homed") C-VLAN segment has one or more customer edge bridges (CEs) connecting to two or more distinct provider edge bridges (PEs). In FIG. 1a, Site D has a dual-homed segment, since CE4 is connected to both PE3 and PE4. A single-homed segment has a single customer edge bridge connected to a single provider edge bridge. In FIG. 1a, Site C has a single-homed segment, since CE3 is coupled only to PE3. When two or more bridges from different segments of a C-VLAN are also connected through a path outside of the provider domain, these bridges have a "backdoor" link. In FIG. 1a, a backdoor link exists between CB1 and CB6.

FIG. 1a shows the backdoor link between CB1 and CB6 as active. Normally, in typical configurations, the backdoor link is used for backup purposes and is normally blocked. The backdoor link could be used, for example, because of a broken CB6-CE2 link, which would prevent communication between Computers X and Y through the provider network 12.

For purposes of illustration, a computer with MAC address "X" is coupled to a port of bridge CB1 and a computer with MAC address "Y" is coupled to a port of bridge CB5. For each bridge in FIG. 1a, the forwarding port of MAC address "X" and "Y" is shown, as would be provided in a properly configured MAC address table. For example, when bridge PE1 receives an incoming frame addressed for "X", the frame is forwarded to the port connected to bridge CE1. Similarly, when bridge CB6 receives a frame addressed to "X", it is forwarded to bridge CB1 over the backdoor link. On the other hand, when bridge CB6 receives a frame addressed to "Y", the frame is forwarded to the port connected to CB5. With the backdoor link active, no frames destined for "Y" from Site A will pass through the provider network 12, but frames from Site B, specifically frames received on bridges CE2 and CB4, may pass through the provider network 12 to get to the backdoor link.

Topology changes in a customer LAN segments may or may not affect the entries in the MAC address table. Backdoor links and multi-homed LAN segments, in general, may pose problems because they can create loops together with the provider network and, therefore, need to be configured carefully.

FIG. 1b illustrates a topology change that will affect the MAC address tables of the bridges in Site A, but does not affect the MAC address table in any of the provider bridges. In FIG. 1b, the CB2-CB3 link is activated and the CE1-CB1 link is blocked. TCNs will be generated accordingly within the Customer VLAN 18 to indicate that changes have been made to the topology. TCNs are generated as a BPDU (Bridge Protocol Data Unit); if the TCN flag is set in a BDPU, it is interpreted as a TCN. The MAC address tables for CE1 and CB2 must be changed in response to these TCNs, but the forwarding address in the provider bridges remain valid with regard to addresses X and Y. Therefore, unlearning address in the provider domain due these TCNs would be wasteful.

Figure 1C:
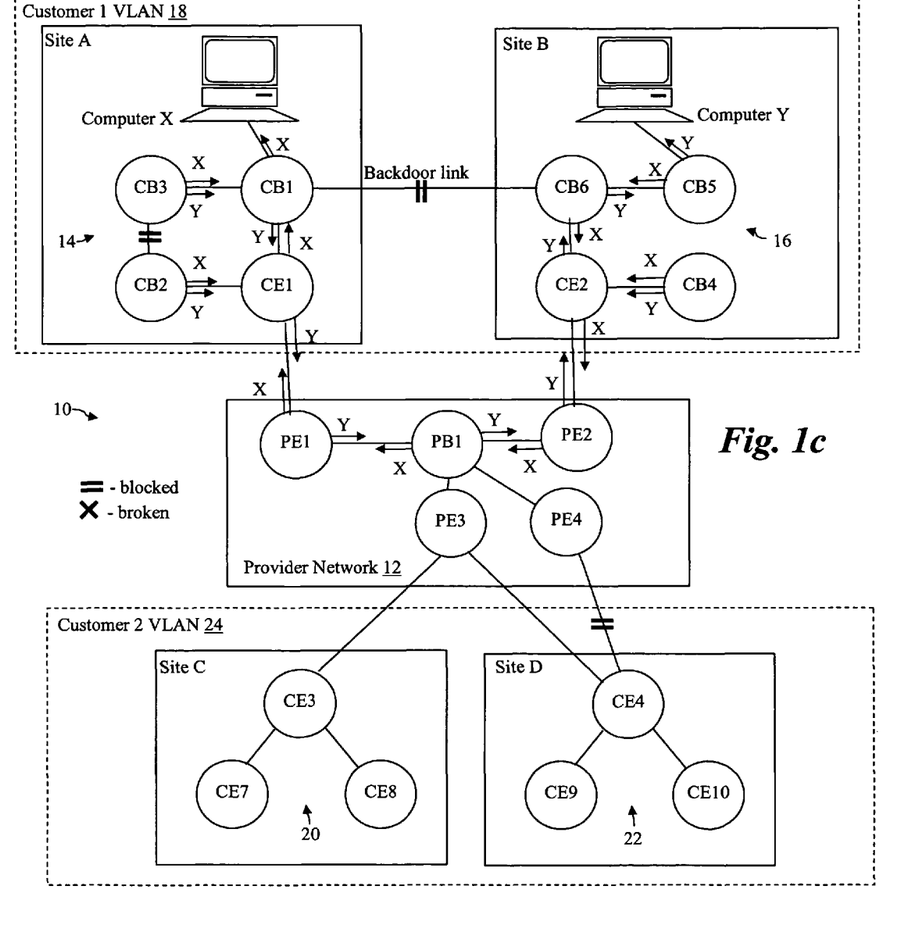

FIG. 1c, on the other hand, shows a topology change that would affect the MAC address tables in the provider bridges. In this scenario, the broken CE2-CB6 link is repaired, and the spanning tree software blocks the backdoor link accordingly. Once this is done, the provider bridges will begin receiving frames for address Y on ports which previously were used to forward frames destined for address Y. Therefore, in response to the TCNs generated for this topology change, the provider bridges will need to unlearn and relearn the forwarding addresses.

Figure 2A:
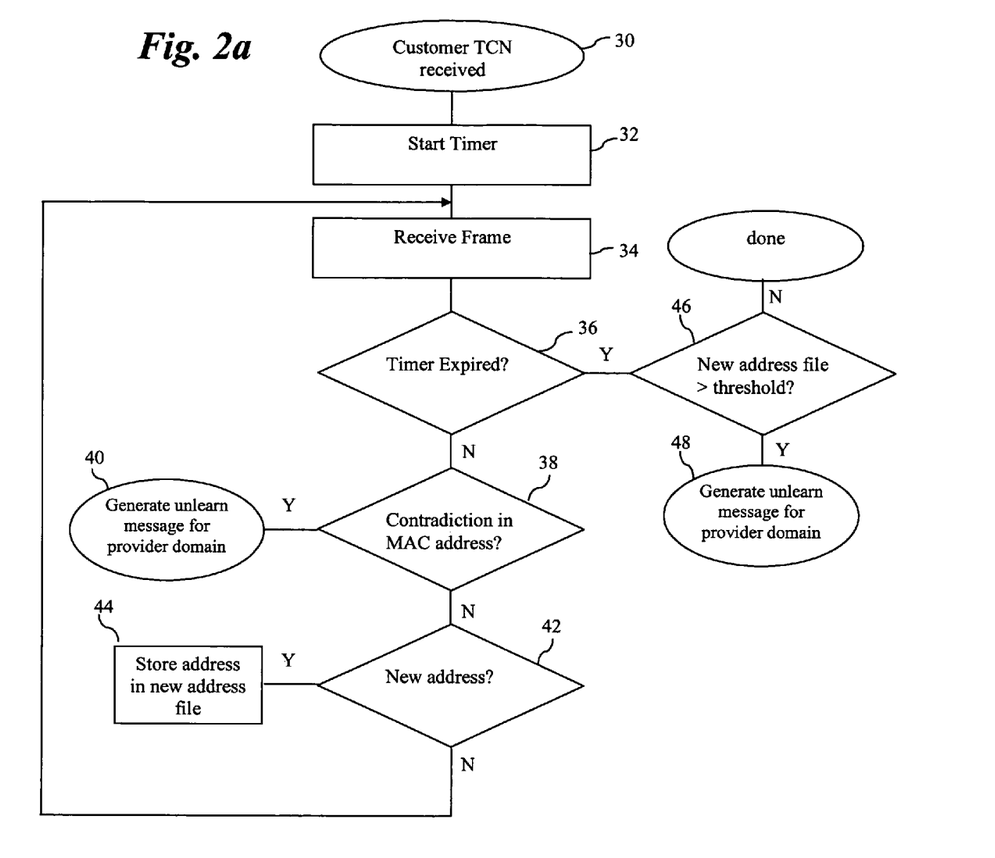
FIG. 2a illustrates a flow chart of a first embodiment of a routine executed by a provider edge bridge for detecting a topology change affecting paths through the backdoor connection.

FIG. 2a illustrates a flow chart of a first embodiment of software implemented in the provider edge bridges for efficiently processing customer TCNs generated by the C-VLAN spanning tree. In step 30, the PE receives a customer BDPU with the TCN flag set. In response to receiving the TCN, the PE starts a timer in step 32. During the time period of the timer, the PE monitors the MAC addresses of incoming frames from end hosts to determine whether the MAC addresses indicate a topology change in the customer VLAN that will require an unlearning operation in MAC address tables of the provider domain.

So long as the timer is not expired in step 36, the PE checks the MAC address in each incoming frame (step 38) and determines whether the MAC address is detected in a port that contradicts the information in the MAC address table (e.g., a MAC address for an end host previously seen on a customer facing port is now seen on a provider facing port). If so, then the PE initiates unlearning procedures (such as generating an unlearn message in the provider domain, as shown, or setting a bit on a message snooped by other bridges), wherein all of the bridges in the provider domain participating in this customer VLAN are flushed in step 40. If the incoming MAC address does not contradict information in the MAC address table in step 38, but the PE determines it is a new address (i.e., not in the PE's MAC address table), then the new address is written to a new address file in step 44. Steps 38-44 are repeated all frames received for the duration of the timer. When the timer expires in step 36, if the new address file has a number of entries that exceeds a predetermined threshold in step 46, then an unlearn message is generated in step 48.

The flowchart of FIG. 2a determines whether a TCN was generated for a topology change in the customer domain that may require unlearning/relearning operations in the provider domain, by checking for contradictory MAC address or new MAC addresses. However, receiving a new MAC address does not conclusively mean that the new address was received due to the topology change indicated by the received TCN. A new MAC address could also indicate that a MAC address was not previously active. Thus, an unlearning operation could be unnecessary.

Figure 2B:
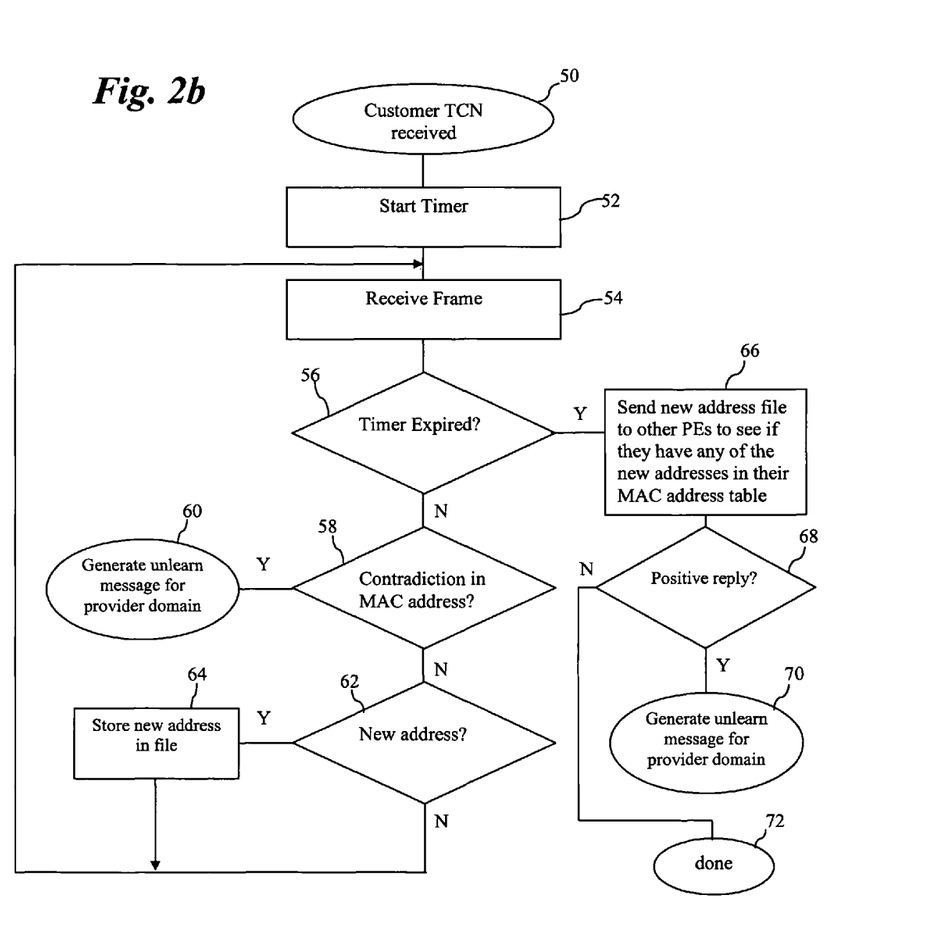
FIG. 2b illustrates a flow chart of a second embodiment of a routine executed by a provider edge bridge for detecting a topology change affecting paths through the backdoor connection.

Accordingly, an alternative embodiment of the MAC address monitoring software is shown in FIG. 2b. As in the previous figure, an incoming TCN in step 50 initiates a timer in step 52. As frames are received (step 54) during the period of the timer (step 56), a contradiction between the MAC address of the incoming frame and the PE's MAC address table (step 58) results in the initiation of an unlearn message to unlearn addresses in the provider domain (step 60). If the MAC address of the incoming frame is not contradictory in step 58, but is a new address in step 62, it is stored in a new address file in step 64. Steps 58-64 are repeated until the timer expires in step 56. Once the timer expires, the new address file of the PE is sent to other PEs in step 66 to determine whether any of the new address in the file are ones that have been previously learned by the other PEs.

If the PE received any positive replies from other PEs (i.e., replies indicating that one or more of the addresses in the new address file were previously learned), an unlearn message is generated in step 70. Otherwise, the monitoring is finished in step 72, and it is assumed that the TCN did not involve a backdoor in the customer VLAN topology.

While the new address file operations described in steps 62-72 more accurately determine whether a unlearn command is warranted due to a topology change, these steps require additional signaling between PE's. Querying PEs can be realized in several ways. One way would be to use an unreliable broadcast for a few times and to wait for replies for a period of time. If no replies are received during this period, the PE can trigger unlearning in the provider domain. Alternatively, a reliable transportation mechanism can be used with the other PEs, with acknowledgements between the querying PE and the other PEs.

The method described above can detect all topology changes which affect paths through the provider network 12. In some cases, a provider network may have sufficient information about a customer VLAN to determine if topology changes in the customer VLAN should trigger unlearning in the provider domain. FIGS. 3a through 8 illustrate operation of the PEs for various multi-homed topologies. While the examples are given with regard to dual-homed topologies, the methods described herein will work with three or more distinct connections to the provider network 12 as well.

Figure 3A:
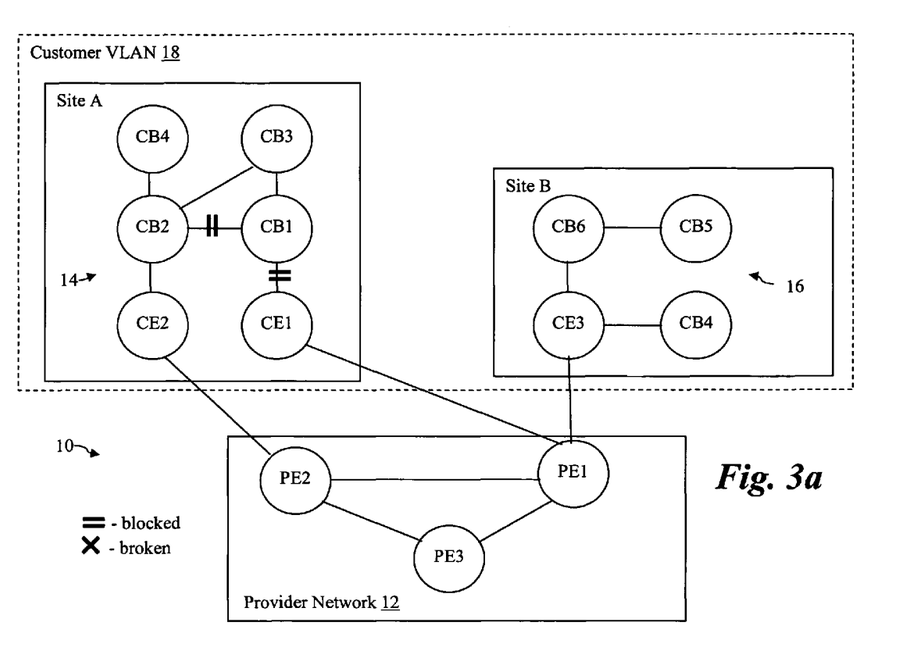
FIGS. 3a through 3c illustrate a first topology of a Customer VLAN using multi-ported connections to the provider network.
Figure 3B:
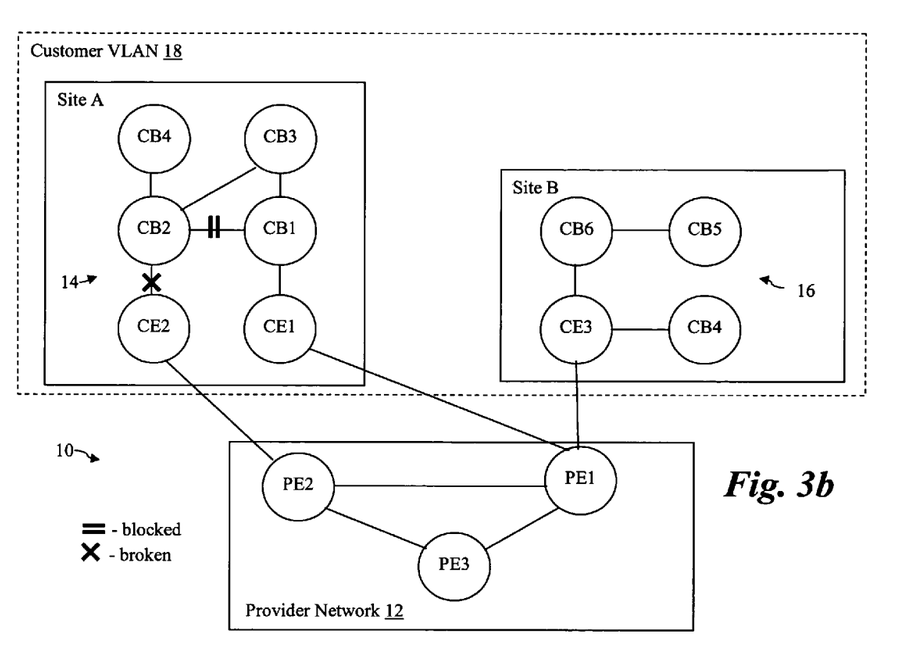

In FIG. 3a, Site A has a dual-homed connection to the provider network 12, since CE1 is linked to PE1 and CE2 is linked to PE2. To prevent loops, the CE1-CB1 and CB1-CB2 links are blocked by the tree spanning software. In FIG. 3b, a scenario is shown where a failure at the CE2-CB2 link causes the spanning tree software to reactivate the CE1-CB1 link. When the TCNs are generated for this topology change, it is necessary for PE1 to be snooping the TCN such that an unlearning message can be sent to bridges in the provider domain.

Figure 3C:
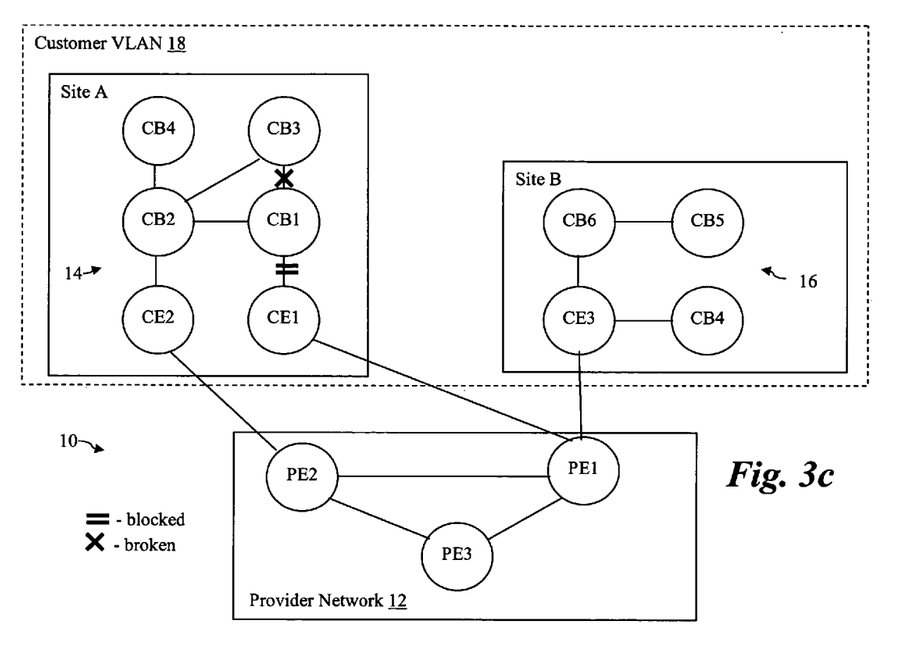

As shown in FIG. 3c, however, not all TCNs received by PE1 will require unlearning. In this case (using the topology shown in FIG. 3a as the initial condition), a failure occurs in the CB1-CB3 link. Accordingly, the spanning tree software must reactivate the CB1-CB2 link. This change does not affect the forwarding of frames through PE1 or PE2; thus, the TCNs generated as a result of the topology change in Site A do not need to start unlearning in the provider domain.

Figure 4:
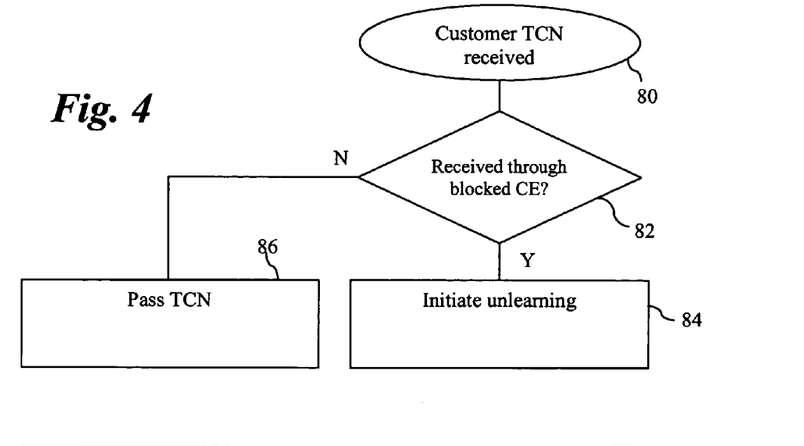
FIG. 4 illustrates a flow chart of a first embodiment of a routine executed by a provider edge bridge for detecting a topology change affecting paths through the multi-homed connection.

FIG. 4 illustrates a flow chart for a method of selectively snooping TCNs when a PE is aware that only one of multiple CEs will be active (i.e., only one CE is passing frames to/from end hosts) at any one time. When a customer TCN is received in step 80, if the TCN is received through a blocked CE in block 82, then it starts unlearning in the provider domain in step 84. On the other hand, if the customer TCN is not received through the blocked CE, then it is passed through the provider network 12 without generating an unlearn command in step 86.

Figure 5:
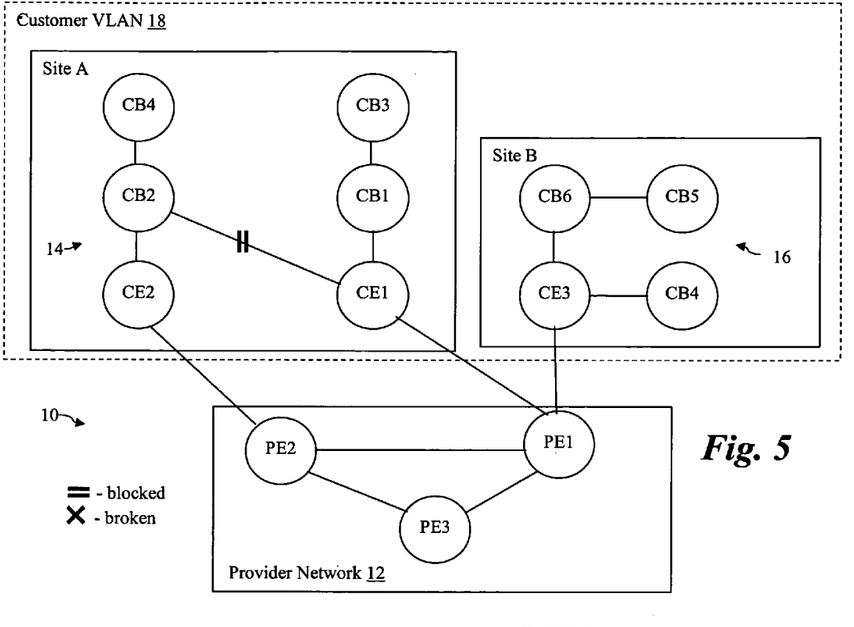
FIG. 5 illustrates a second topology of a Customer VLAN using multi-ported connections to the provider network.

FIG. 5 illustrates an example of a dual-homed network where both CEs are active, with a blocked CB2-CE1 connection. With the blocked CB2-CE1 connection, both the CE1-PE1 and CE2-PE2 are single-homed, and TCNs received by the PEs can be passed through the provider network 12 without generating an unlearn command. If only the method of FIG. 4 was applied, all TCNs from CE1 would be generate an unlearn command, because it is coupled to a blocked link (CB2-CE1). In fact, only TCNs related to the reactivation of the blocked CB2-CE1 link need to be snooped; all others can be passed without initiating unlearning in the provider domain.

Figure 6:
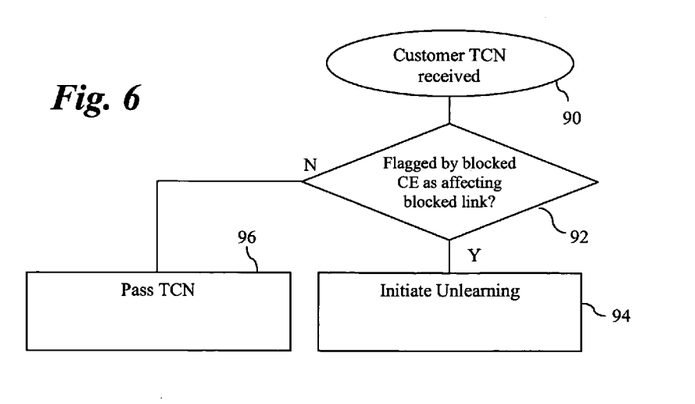
FIG. 6 illustrates a flow chart of a second embodiment of a routine executed by a provider edge bridge for detecting a topology change affecting paths through the multi-homed connection.

FIG. 6 illustrates an example of an alternative method. In this case, an active CE with a blocked connection is responsible for setting a flag bit (a "snooping bit") in a BDPU, indicating whether the TCN is due to a change in status of the blocked link. This flagging need only happen at the CE and, therefore, existing bridges need not generally support it.

In step 90, a customer TCN is received by the PE. In step 92, if the snooping bit is set, indicating that the blocked link is affected by the TCN, then the TCN initiates an unlearn command in step 94. Otherwise, the TCN is passed without generating an unlearn command in step 96.

Figure 7:
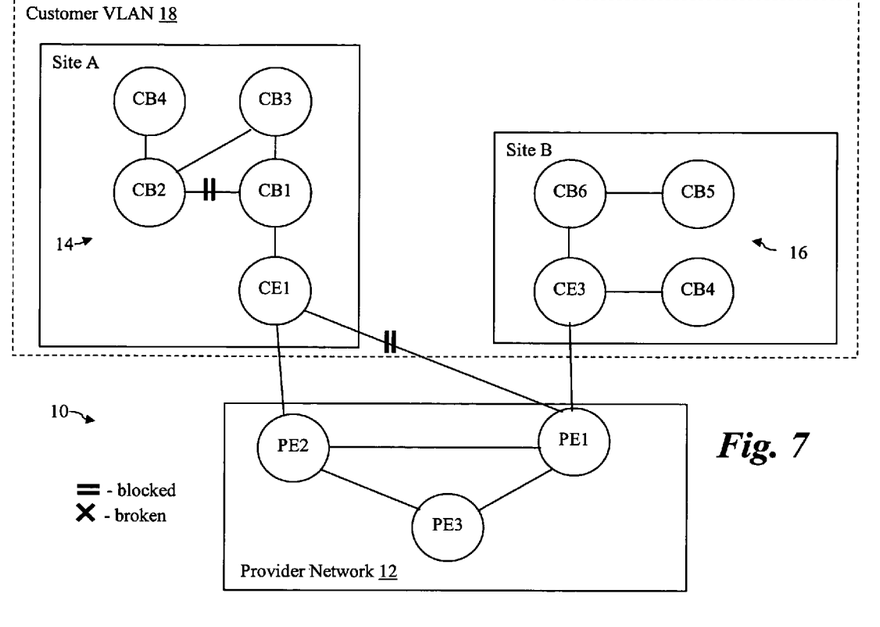
FIG. 7 illustrates a third topology of a Customer VLAN using multi-ported connections to the provider network.

FIG. 7 illustrates another dual-homed topology, where a single CE is linked to two PEs. In this case, one of the links between the CE and the two PEs will always be blocked. As shown, the CE1-PE1 link is blocked and the CE1-PE2 link is active. A failure in the CE1-PE2 link could cause the CE1-PE1 link to be reactivated; the TCNs for such a topology change should initiate unlearning in the provider domain, while other TCNs should be ignored.

As described above, the snooping bit can be set by the CE to indicate which TCNs should initiate unlearning in the provider domain. In this case, the CE could set the snooping bit whenever the TCN is locally generated.

Figure 8:
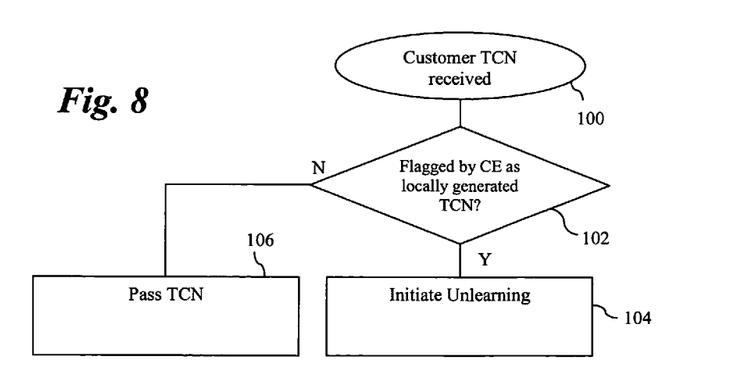
FIG. 8 illustrates a flow chart of a third embodiment of a routine executed by a provider edge bridge for detecting a topology change affecting paths through the multi-homed connection.

FIG. 8 illustrates a flow chart for dealing with TCNs from the topology of FIG. 7. In step 100, a TCN is received from a CE by a PE. If the snooping bit is set in step 102, then the TCN is initiates unlearning in the provider domain in step 104. Otherwise, the TCN is passed without unlearning in step 106.

The snooping bit could be accommodated in any unused bit of the BDPU. In current BDPU implementations, bits 2-7 of the fifth octet (the "flags" field) of the BDPU are unused (bits 1 and 8 are used) for an STP (spanning tree protocol) BDPU and the eighth bit of the fifth octet is unused in an RSTP (rapid spanning tree protocol) BDPU.

The methods described above can greatly reduce the amount of unlearning and relearning in the provider bridges. Thus, they can greatly reduce the broadcasting storms that are seen in the provider domain due to customer TCNs triggering unlearning in the provider domain.

Figure 9:
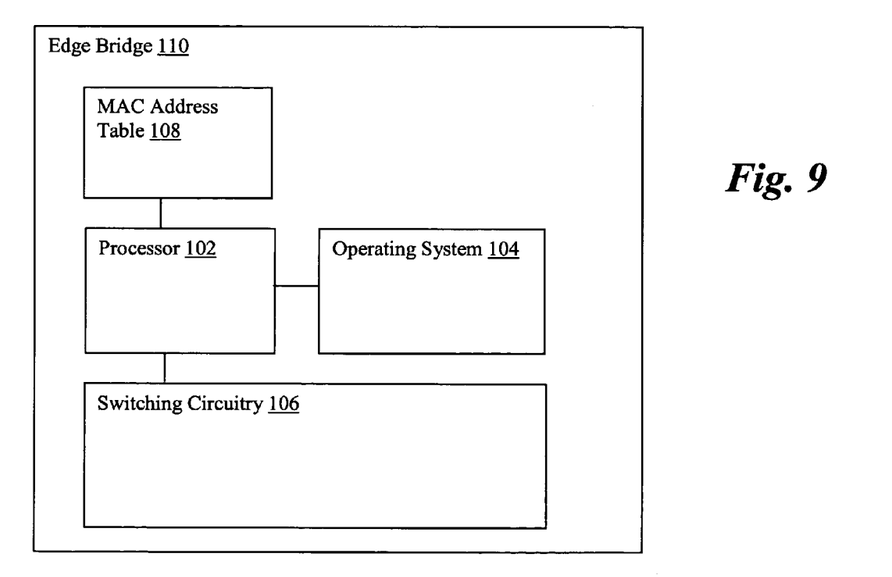
FIG. 9 illustrates a block diagram of a bridge.

FIG. 9 illustrates a basic block diagram of a edge bridge 110, which could be used for a CE or a PE. Edge bridge 110 includes a processor 102, which can be a general purpose processor, operating system software 104, and switching circuitry 106, typically implemented in an ASIC or a gate array. The processor stores relationships between its ports and end host addresses in a MAC address table (or forwarding database) 108.

Operations such as checking snooping bits or TCN flags are preferably performed in the switching circuitry, which is high-speed, while other actions such as starting counters and generating messages are preferable performed in the processor 102 under control of the operating system software 104, which is easily modified.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A method for communication between two or more customer virtual local area network (LAN) segments through a provider network, with each customer virtual LAN segment including a customer edge bridge, and where the provider network has one or more provider edge bridges coupled to the customer edge bridges, comprising the steps of:

in at least one of the provider edge bridges coupled to a customer virtual LAN segment:

receiving a topology change notification (TCN) from a customer network in response to a topology change in one or more of the customer virtual LAN segments;

in response to receiving the TCN from the customer network, monitoring end host media access control (MAC) addresses in data units received from the customer network for a predetermined time period to determine whether the topology change in the one or more of the customer virtual LAN segments affects paths of data units through the provider network;

determining that the topology change in the one or more of the customer virtual LAN segments does not affect paths of data units through the provider network wherein the determining includes:

determining that less than a predetermined number of new end host MAC addresses of data units received from the customer network in the predetermined time period are not found in a MAC address memory file, wherein the MAC address memory file associates end host MAC addresses with ports of the provider edge bridge; and determining no contradictions occur in the predetermined time period between an end host MAC address of a data unit received from the customer network and the MAC address memory file; and in response to determining the topology change in the one or more of the customer virtual LAN segments does not affect paths of data units through the provider network upon receiving the TCN from the customer network, storing the new end host MAC addresses of data units received from the customer network in the predetermined time period in the MAC address memory file without flushing the MAC address memory file; and in response to determining the topology change in the one or more of the customer virtual LAN segments affects paths of data units through the provider network upon receiving the TCN from the customer network, flushing the MAC address memory file.

2. The method of claim 1 further comprising: storing a list of the end host MAC addresses that are received during the predetermined time period and are not found in the address memory file.

3. The method of claim 1 wherein said end host address are media access control (MAC) addresses.

4. The method of claim 1 wherein the data units are frames.

5. A provider edge bridge of a provider network for providing communication with one or more customer edge bridges of customer local area network (LAN) segments, comprising:

processing circuitry for:

receiving a topology change notification (TCN) from the one or more customer edge bridges in response to a topology change in one or more of the customer LAN segments;

in response to receiving the TCN from the one or more customer edge bridges, monitoring end host media access control (MAC) addresses in data units received from the one or more customer edge bridges for a predetermined time period to determine whether the topology change in the one or more of the customer LAN segments affects paths of data units through the provider network;

determining that the topology change in the one or more of the customer LAN segments does not affect paths of data units through the provider network by:

determining less than a predetermined number of end host MAC addresses of data units received from the customer network in the predetermined time period are not found in a MAC address memory file, wherein the MAC address memory file associates end host MAC addresses with ports of the provider edge bridge; and determining no contradictions occur in the predetermined time period between an end host MAC address of a data unit received from the customer network and the MAC address memory file;

flushing the MAC address memory file when it is determined that topology change has occurred in one or more of the customer LAN segments and the topology change does affect paths of data units through the provider network; and in response to determining that the topology change in the customer LAN segments does not affect paths of data units through the provider network, storing any of the end host MAC addresses of data units received from the customer network in the predetermined time period not found in the MAC address memory file in the MAC address memory file without flushing the MAC address memory file.

6. The provider edge bridge of claim 5 further comprising:
a memory for storing a list of end host addresses that are received during the predetermined time period and are not found in the address memory file.

7. The provider edge bridge of claim 5 wherein said end host address are media access control (MAC) addresses.

8. The provider edge bridge of claim 5 wherein the data units are frames.

9. A method of a provider edge bridge for a provider network coupled to a customer virtual LAN segment, comprising:
receiving a topology change notification (TCN) by the provider edge bridge from the customer virtual LAN segment in response to a topology change in the customer virtual LAN segment;
in response to receiving the TCN from the customer virtual LAN segment, determining that the topology change in the customer virtual LAN segment does not affect entries in a media access control (MAC) address memory file of the provider edge bridge, by monitoring end host MAC addresses in data units received from the customer virtual LAN network for a predetermined time period, wherein the determining includes:
determining that an end host MAC address of a data unit received from the customer network does not contradict information in the MAC address memory file; and
determining that a predetermined number of new end host MAC addresses in the data units received from the customer virtual LAN network during the predetermined time period is within a predetermined threshold; and
in response to determining that the topology change in the customer virtual LAN segments does not affect entries in the MAC address memory file of the provider edge bridge, storing the new end host MAC addresses in the data units received from the customer network during the predetermined time period in the MAC address memory file without generating an unlearning operation of the MAC address memory file in response to receiving the TCN from the customer virtual LAN network; and
in response to determining the topology change in the one or more of the customer virtual LAN segments affects paths of data units through the provider network upon receiving the TCN from the customer network, flushing the MAC address memory file.

10. The method of claim 9, wherein the determining that the topology change in the customer virtual LAN segments does not affect entries in a media access control (MAC) address memory file, further includes:
storing the new end host MAC addresses in the data units received from the customer virtual LAN network during the predetermined time period in a new address file;
transmitting the new address file to other provider edge bridges to determine whether the new address have been learned by the other provider edge bridges; and
when new end host MAC addresses were not learned by the other provider edge bridges, storing the new end host MAC addresses in the MAC address memory file without generating an unlearning operation of the MAC address memory file in response to receiving the TCN from the customer virtual LAN network.

* * * * *